United States Patent
Jeong et al.

(10) Patent No.: US 11,777,179 B2
(45) Date of Patent: Oct. 3, 2023

(54) ELECTRODE ASSEMBLY, SECONDARY BATTERY INCLUDING SAME, AND METHOD FOR MANUFACTURING SAME

(71) Applicant: Samsung SDI Co., Ltd., Yongin-si (KR)

(72) Inventors: Hyun Ki Jeong, Yongin-si (KR); Min Yeol Choi, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 178 days.

(21) Appl. No.: 17/049,758

(22) PCT Filed: Apr. 22, 2019

(86) PCT No.: PCT/KR2019/004807
§ 371 (c)(1),
(2) Date: Oct. 22, 2020

(87) PCT Pub. No.: WO2019/208985
PCT Pub. Date: Oct. 31, 2019

(65) Prior Publication Data
US 2021/0242545 A1 Aug. 5, 2021

(30) Foreign Application Priority Data
Apr. 24, 2018 (KR) .......................... 10-2018-0047453

(51) Int. Cl.
*H01M 50/538* (2021.01)
*H01M 10/04* (2006.01)
(Continued)

(52) U.S. Cl.
CPC ..... *H01M 50/538* (2021.01); *H01M 10/0431* (2013.01); *H01M 50/534* (2021.01);
(Continued)

(58) Field of Classification Search
CPC .. H01M 50/548; H01M 50/107; H01M 50/46; H01M 50/466; H01M 50/533;
(Continued)

(56) References Cited

U.S. PATENT DOCUMENTS 7,875,379 B2   1/2011   Moceri et al.
10,320,024 B2  6/2019   Chun
(Continued)

FOREIGN PATENT DOCUMENTS

JP   2004-234994 A    8/2004
KR   10-0462128 B1   12/2004
(Continued)

OTHER PUBLICATIONS

International Search Report dated Jul. 30, 2019, for corresponding International Application No. PCT/KR2019/004807 filed Apr. 22, 2019, 5 pages.
EPO Extended European Search Report dated Nov. 29, 2021, issued in corresponding European Patent Application No. 19791677.8 (9 pages).

*Primary Examiner* — Jonathan G Jelsma
*Assistant Examiner* — Omar M Kekia
(74) *Attorney, Agent, or Firm* — Lewis Roca Rothgerber Christie LLP (57) ABSTRACT

The present invention provides an electrode assembly, which can reduce resistance and improve a process property, a secondary battery including same, and a method for manufacturing same. For example, disclosed is an electrode assembly comprising: a first electrode plate having a first electrode tab attached thereto: a plurality of second electrode plates having second electrode tabs attached thereto, respectively, and a separator interposed between the first electrode plate and the plurality of second electrode plates, wherein the first electrode plate, the separator, and the plurality of second electrode plates are wound in a state of being stacked on one another, and the second electrode tabs are formed to (Continued)

be symmetrical to each other on the basis of a winding center thereof.

10 Claims, 6 Drawing Sheets

(51) Int. Cl.
*H01M 50/534* (2021.01)
*H01M 50/536* (2021.01)
*H01M 50/548* (2021.01)
*H01M 50/107* (2021.01)
*H01M 50/46* (2021.01)
*H01M 50/466* (2021.01)
*H01M 50/533* (2021.01)
*H01M 10/0587* (2010.01)

(52) U.S. Cl.
CPC ...... *H01M 50/536* (2021.01); *H01M 10/0587* (2013.01); *H01M 50/107* (2021.01); *H01M 50/46* (2021.01); *H01M 50/466* (2021.01); *H01M 50/533* (2021.01); *H01M 50/548* (2021.01); *Y02E 60/10* (2013.01); *Y02P 70/50* (2015.11)

(58) Field of Classification Search
CPC ......... H01M 10/0431; H01M 10/0587; H01M 50/538; Y02P 70/50; Y02E 60/10
USPC .......................................................... 429/94
See application file for complete search history.

(56) References Cited

U.S. PATENT DOCUMENTS

| | | |
|---|---|---|
| 10,505,242 B2 | 12/2019 | Choi et al. |
| 2007/0009789 A1 | 1/2007 | Moceri et al. |
| 2009/0130548 A1* | 5/2009 | Lee ................... H01M 10/0431 429/161 |
| 2012/0189894 A1 | 7/2012 | Ahn |
| 2012/0208055 A1* | 8/2012 | Ahn ................... H01M 10/0431 429/94 |
| 2012/0321942 A1* | 12/2012 | Ahn ....................... H01M 50/55 429/185 |
| 2013/0143088 A1* | 6/2013 | Cho ....................... H01M 50/42 29/874 |
| 2015/0287966 A1* | 10/2015 | Jeong ..................... H01M 50/40 429/211 |
| 2015/0295270 A1 | 10/2015 | Chun |
| 2018/0097267 A1 | 4/2018 | Choi et al. |
| 2019/0229362 A1 | 7/2019 | Toon et al. |
| 2020/0076030 A1 | 3/2020 | Choi et al. |

FOREIGN PATENT DOCUMENTS

| | | |
|---|---|---|
| KR | 10-2012-0099345 A | 9/2012 |
| KR | 10-2015-0117135 A | 10/2015 |
| KR | 10-2016-0043353 A | 4/2016 |
| KR | 10-1651712 B1 | 8/2016 |
| KR | 10-2016-0129571 A | 11/2016 |
| KR | 10-2018-0022429 A | 3/2018 |
| KR | 10-2018-0036455 A | 4/2018 |

* cited by examiner

ELECTRODE ASSEMBLY, SECONDARY BATTERY INCLUDING SAME, AND METHOD FOR MANUFACTURING SAME

CROSS-REFERENCE TO RELATED APPLICATION(S)

This application is a National Phase Patent Application of International Patent Application Number PCT/KR2019/004807, filed on Apr. 22, 2019, which claims priority of Korean Patent Application No. 10-2018-0047453, filed Apr. 24, 2018. The entire contents of both of which are incorporated herein by reference.

TECHNICAL FIELD

The present invention relates to an electrode assembly, a secondary battery including the same, and a method for manufacturing the same.

BACKGROUND ART

In general, a secondary battery is manufactured by accommodating an electrode assembly, which is constituted by a positive electrode plate, a negative electrode plate, and a separator inserted between the two electrode plates, into a case together with an electrolyte. The secondary battery is a chargeable and dischargeable battery, unlike a primary battery that is not chargeable. As the technologies for mobile devices such as mobile phones and laptop computers have been developed, and the output of the mobile devices has increased, the demand for the secondary batteries as an energy source has rapidly increased. In recent years, secondary batteries have been actively studied and developed as an alternative energy source for replacing fossil fuels, even for the purpose of electric vehicles or hybrid electric vehicles.

The currently commercialized secondary batteries include nickel-cadmium batteries, nickel-hydrogen batteries, nickel-zinc batteries, and lithium secondary batteries. Among them, the lithium secondary batteries have been spotlighted in that the lithium secondary batteries are freely charged and discharged because the lithium secondary batteries hardly exhibit a memory effect as compared with the nickel-based secondary batteries, have a very low self-discharge rate, and have a high energy density.

However, when a lithium secondary battery is overcharged to a specific voltage or more, a reaction of a positive electrode active material and an electrolyte constituting the lithium secondary battery is excessively progressed and is accompanied by a structural collapse of the positive electrode active material and an oxidation reaction of the electrolyte, and lithium may be also extracted from a negative electrode active material. If this state continues, the lithium secondary batteries may be ignited or exploded.

DISCLOSURE OF THE INVENTION

Technical Problem

The present invention provides an electrode assembly reducing resistance and improving process efficiency, a secondary battery including the same, and a method for manufacturing the same.

Technical Solution

An electrode assembly according to the present invention may include: a first electrode plate, to which a first electrode tab is attached; a plurality of second electrode plates, to which second electrode tabs are attached, respectively; and a separator interposed between the first electrode plate and each of the plurality of second electrode plates, wherein the first electrode plate, the separators, and the plurality of second electrode plates are wound while being stacked, and wherein the second electrode tabs are formed to be symmetrical with respect to a winding center.

Here, the first electrode tab may be located at the winding center.

In addition, the plurality of second electrode plates may be wound to be located on a first surface and a second surface of the first electrode plate, respectively.

In addition, the separator may be provided in plurality to be wound so as to cover the plurality of second electrode plates, respectively.

In addition, the separators may be folded to cover the plurality of second electrode plates, respectively, so that the plurality of second electrode plates are separated from the first electrode plate.

In addition, the first electrode tab and the second electrode tabs may be located in a straight line on a cross-section that is perpendicular to a winding axis of the electrode assembly.

In addition, the plurality of second electrode plates may be wound to be symmetrical to each other with reference to the first electrode plate, respectively.

Furthermore, a secondary battery includes the electrode assembly.

Furthermore, a method for manufacturing the electrode assembly according to the present invention may include: coupling a mandrel to a first electrode plate, to which a first electrode tab is attached at a central portion thereof so that the first electrode tab is prepared to be located on the mandrel; locating a plurality of second electrode plates, to which second electrode tabs are attached, respectively, on a first surface and a second surface of the first electrode plate; and allowing the mandrel to rotate in one direction so as to perform winding.

Here, the plurality of second electrode plates may be located on the first electrode plate while being covered by a plurality of separators, respectively.

Advantageous Effects

The electrode assembly, the secondary battery including the same, and the method for manufacturing the same according to the present invention may reduce the resistance of the electrode assembly and improve the process efficiency.

DESCRIPTION OF THE SYMBOLS IN MAIN PORTIONS OF THE DRAWINGS

100: Secondary battery
110: Case
120,220,320,420: Electrode assembly
130: Cap assembly

BEST MODE FOR CARRYING OUT THE INVENTION

An exemplary embodiment of the present invention will be described below in detail with reference to the accompanying drawings so that an ordinary person skilled in the art to which the present invention pertains can easily carry out the present invention.

Figure 1:
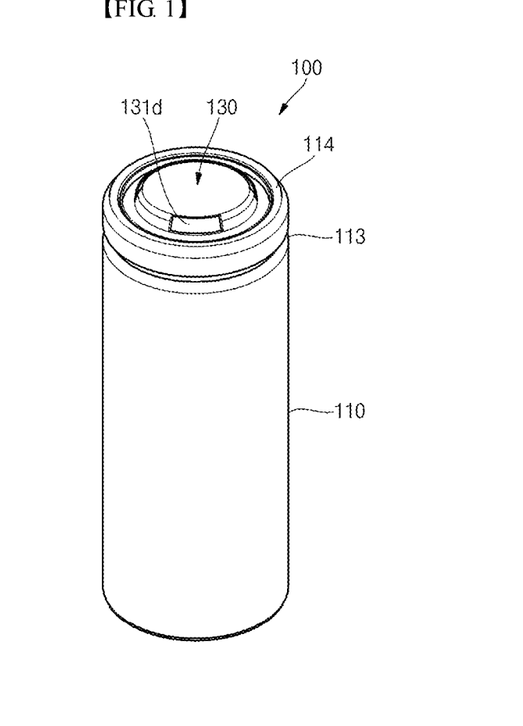
FIG. 1 is a perspective view illustrating a secondary battery according to an embodiment of the present invention.
Figure 2:
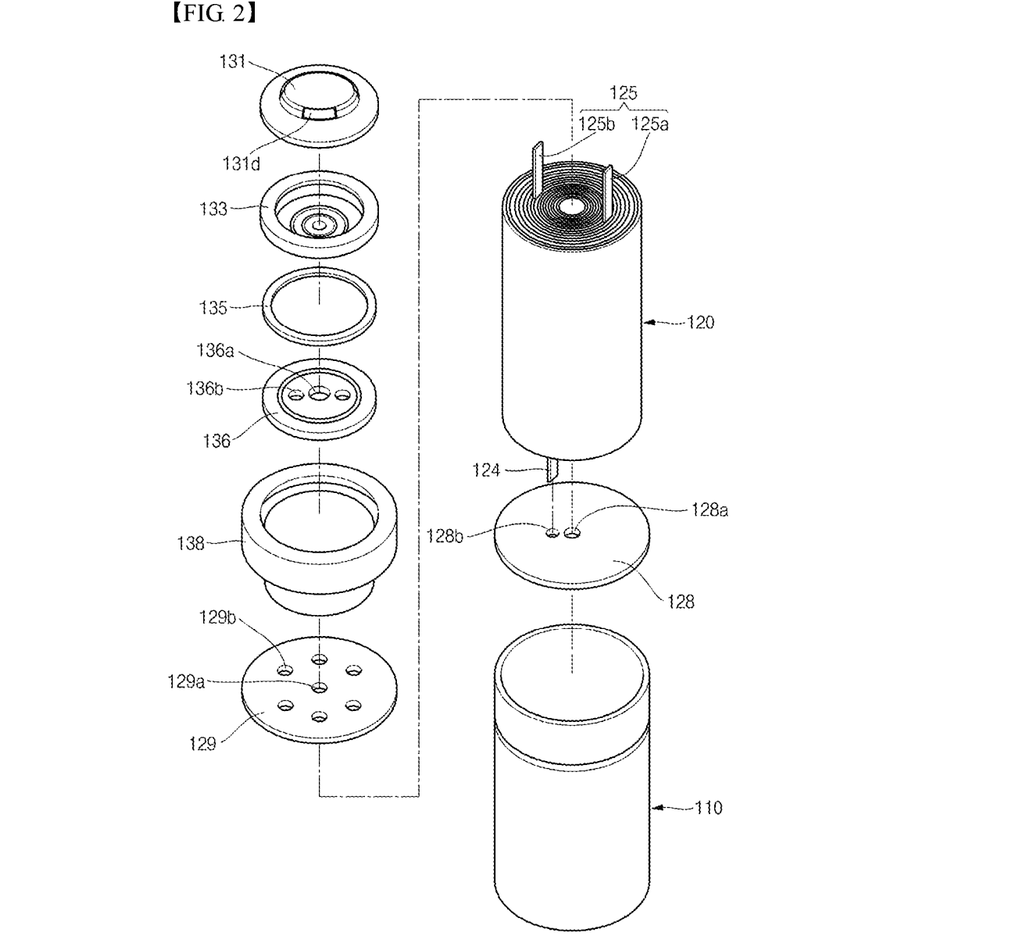
FIG. 2 is an exploded perspective view illustrating the secondary battery according to the embodiment of the present invention.
Figure 3:
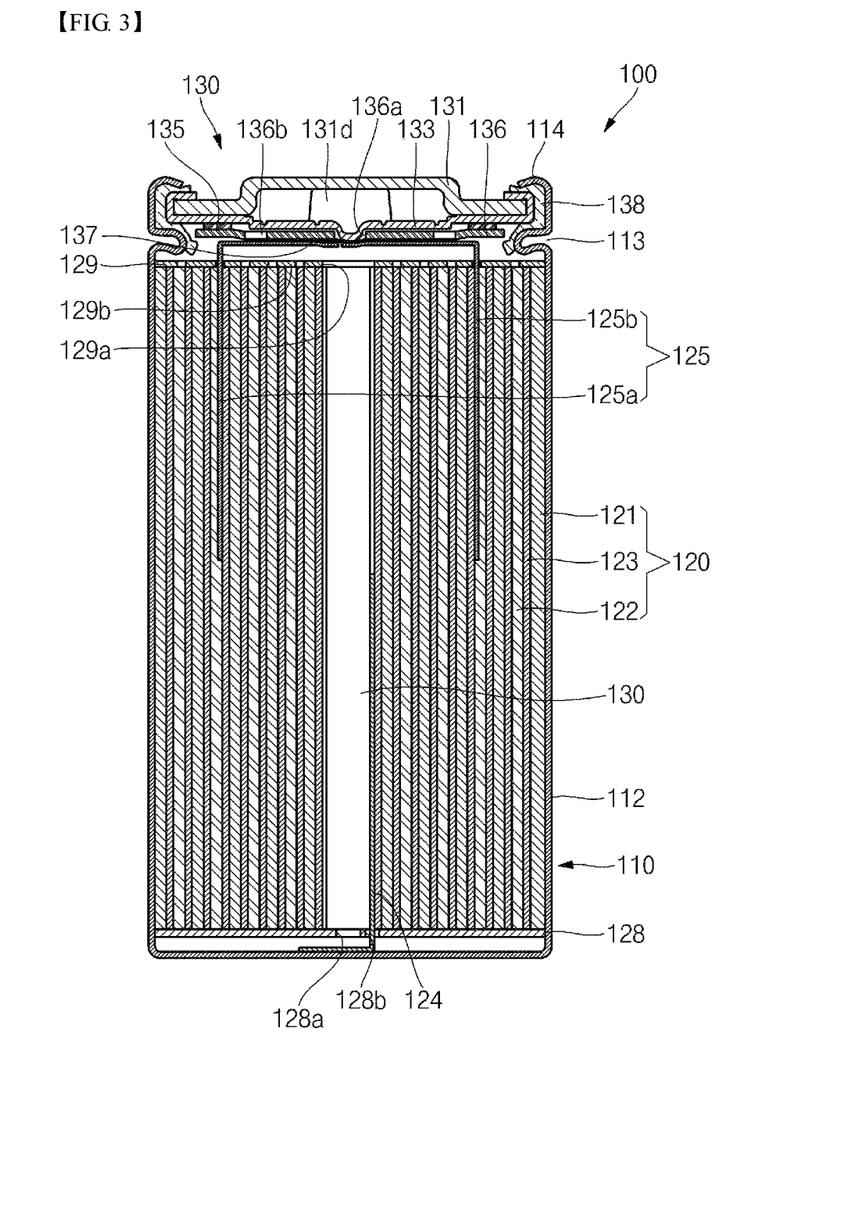
FIG. 3 is a longitudinal sectional view illustrating the secondary battery according to the embodiment of the present invention.
Figure 4:
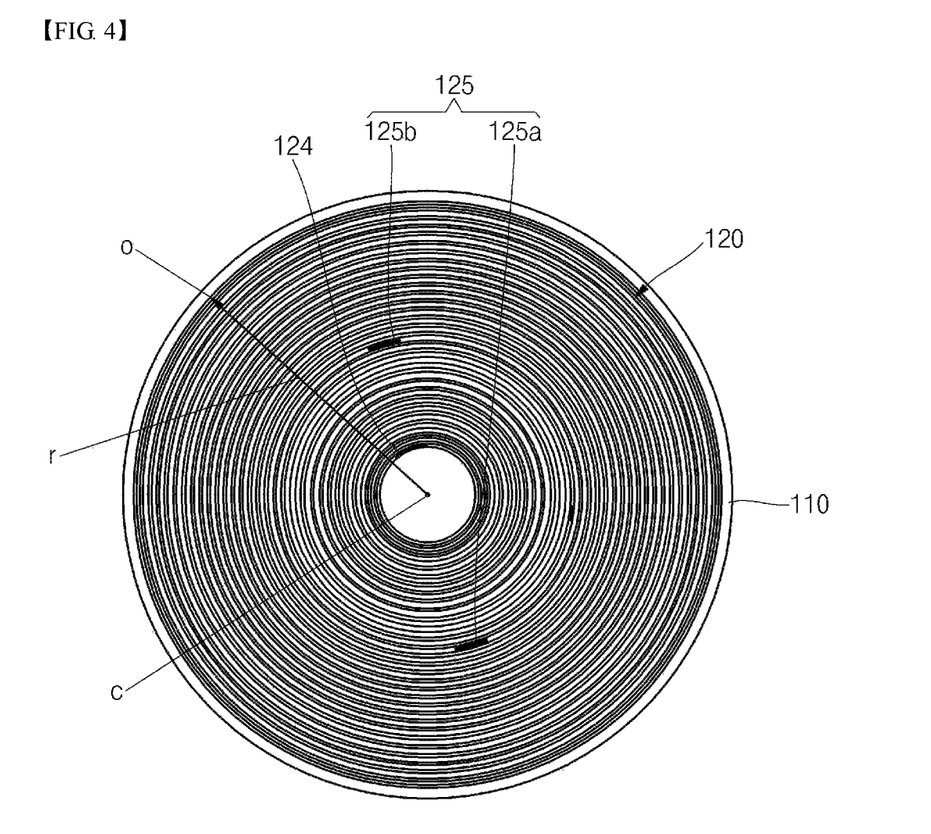
FIG. 4 is a transverse sectional view illustrating the secondary battery according to the embodiment of the present invention.

FIG. 1 is a perspective view illustrating a secondary battery according to an embodiment of the present invention. FIG. 2 is an exploded perspective view illustrating the secondary battery according to the embodiment of the present invention. FIG. 3 is a longitudinal sectional view illustrating the secondary battery according to the embodiment of the present invention. FIG. 4 is a transverse sectional view illustrating the secondary battery according to the embodiment of the present invention.

As illustrated in FIGS. 1 to 5, a secondary battery 100 according to the present invention includes a case 110, an electrode assembly 120 accommodated in the case 110, and a cap assembly 130 sealing an upper end opening of the case 110.

The case 110 includes a circular bottom part 111 and a side part 112 extending upward from the bottom part 111 by a predetermined length. Here, the secondary battery 100 is illustrated as a cylindrical secondary battery, but may be applied to prismatic and pouch type secondary batteries, and the shape of the secondary battery is not limited to only the circular shape in the present invention. In a process of manufacturing the secondary battery, an upper portion of the case 110 is opened. As a result, in a process of assembling the secondary battery, the electrode assembly 120 may be inserted into the case 110 together with an electrolyte. The case 110 may be made of steel, a steel alloy, aluminum, an aluminum alloy, or an equivalent thereof, but the material thereof is not limited thereto. In addition, a beading part 113 may be formed at a lower portion of the case 110 so as to be recessed to the inside of the cap assembly 130 so that the electrode assembly 120 is not separated to the outside, and a crimping part 114 bent to the inside of the case 110 may be formed at an upper portion of the case 110.

The electrode assembly 120 is accommodated in the inside of the case 110 together with the electrolyte. Here, the electrolyte may be an organic liquid containing salt that is injected so that lithium ions flow between a positive electrode plate and a negative electrode plate, which constitute the electrode assembly 120, and may include a non-aqueous electrolyte that is a mixture of lithium salt such as $LiPF_6$, $LiBF_4$, $LiClO_4$, and a high purity organic solvent, but the present invention is not limited thereto.

The electrode assembly 120 includes a negative electrode plate 121, on which a negative electrode active material is applied, a positive electrode plate 122, on which a positive electrode active material is applied, and a separator 123 interposed between the negative electrode plate 121 and the positive electrode plate 122 to prevent a short-circuit between the negative electrode plate 121 and the positive electrode plate 122 and allow the flow of only lithium ions. The negative electrode plate 121, the positive electrode plate 122, and the separator 123 are wound in a substantially cylindrical shape. In addition, a negative electrode tab 124 protruding and extending downward by a predetermined length may be attached to the negative electrode plate 121 and a positive electrode tab 125 protruding upward by a predetermined length may be attached to the positive electrode plate 122, and vice versa.

Figure 5:
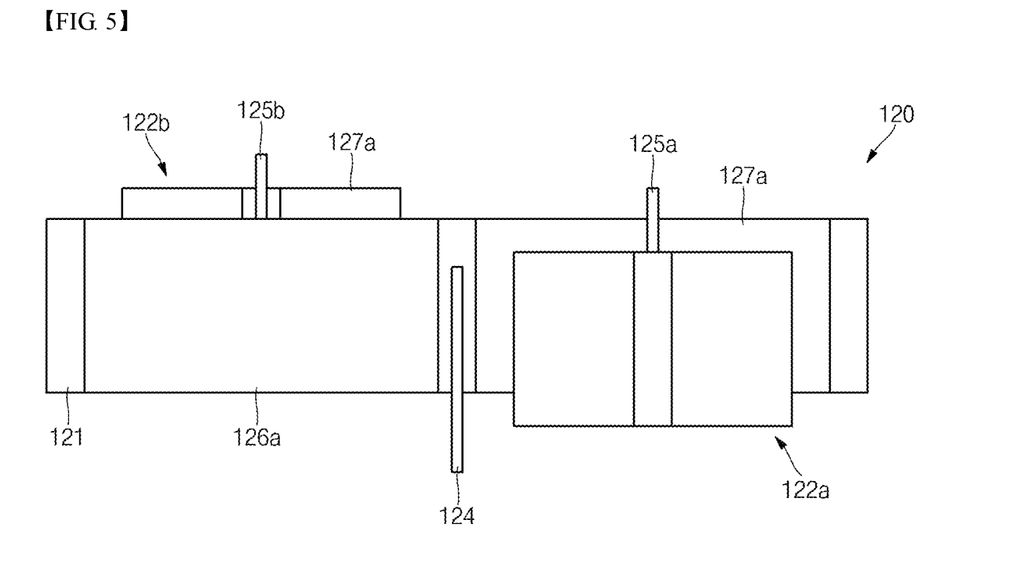
FIG. 5 is a perspective view illustrating an electrode assembly before the electrode assembly is wound in the secondary battery according to the embodiment of the present invention.
Figure 6:
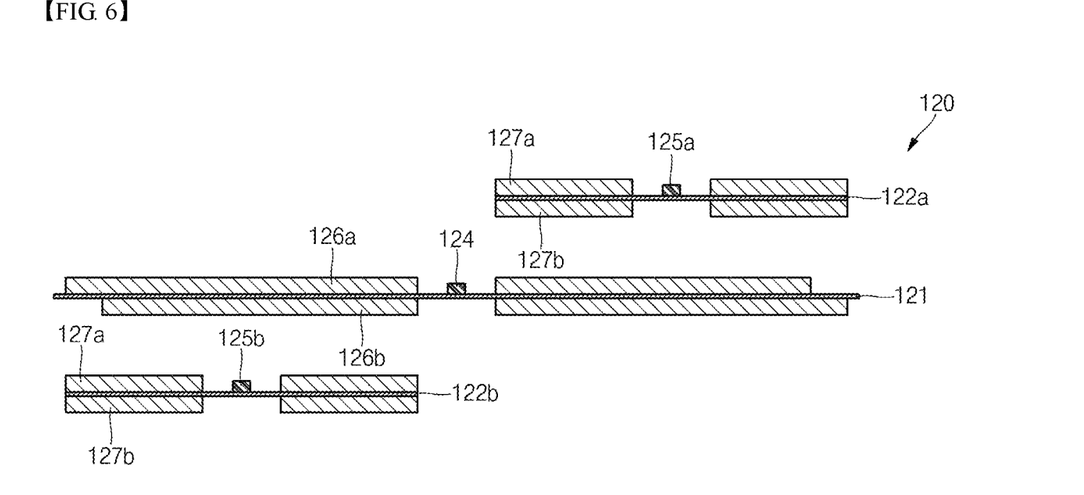
FIG. 6 is a cross-sectional view illustrating the electrode assembly before the electrode assembly is wound in the secondary battery according to the embodiment of the present invention.
Figure 7:
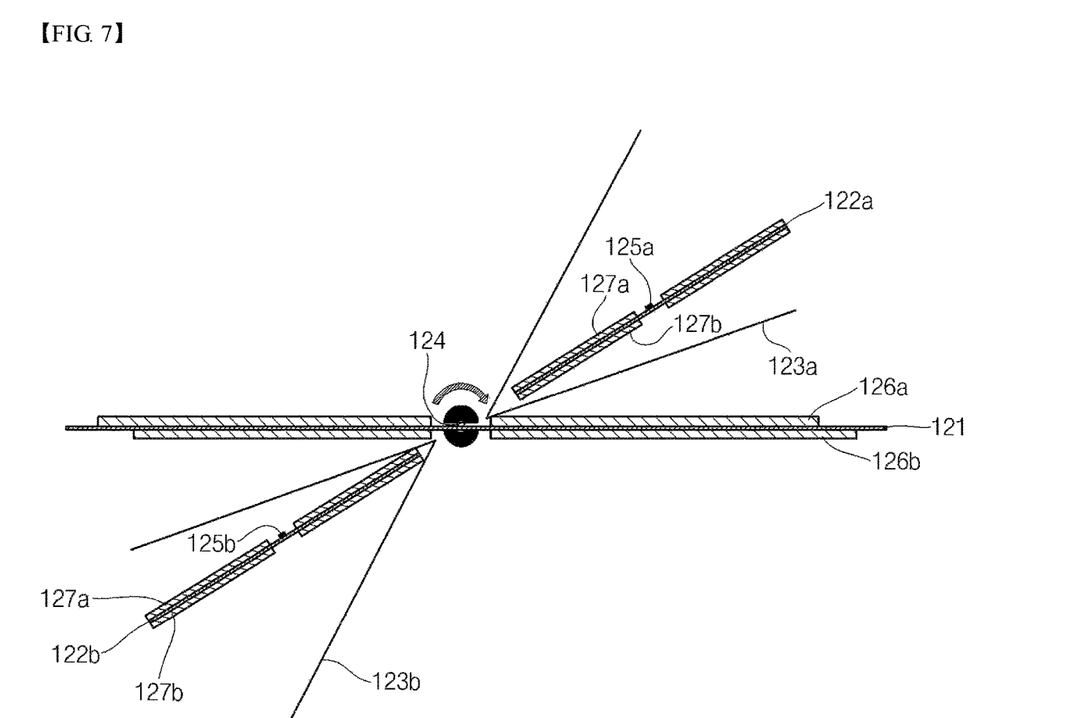
FIG. 7 is a cross-sectional view illustrating a process of winding the electrode assembly of the secondary battery through a mandrel according to the embodiment of the present invention.

Additionally, FIGS. 5 and 6 illustrate a perspective view and a cross-sectional view illustrating the electrode assembly before the electrode assembly is wound in the secondary battery according to the embodiment of the present invention, respectively. FIG. 7 illustrates a cross-sectional view illustrating a process of winding the electrode assembly through a mandrel in the secondary battery according to the embodiment of the present invention. Hereinafter, configurations of the secondary battery and the electrode assembly according to the present invention will be described in detail with reference to FIGS. 5, 6, and 7.

First, the negative electrode plate 121 of the electrode assembly 120 may be constituted by a plate-shaped metal foil made of copper (Cu) or nickel (Ni), and negative electrode coating parts 126a and 126b, which are active materials made of a transition metal oxide, are applied on opposite surfaces of the negative electrode plate 121. Here, the negative electrode coating parts 126a and 126b may include a first negative electrode coating part 126a formed on a first surface of the negative electrode plate 121 and a second negative electrode coating part 126b formed on a second surface that is opposite to the first surface.

Furthermore, the negative electrode plate 121 may be wound together with the positive electrode plate 122 and the separator 123 through the mandrel, and the winding may be started from a central portion of the negative electrode plate 121. In addition, the negative electrode plate 121 may be formed so that the active material is not provided to the wound central portion. That is, since the central portion of the negative electrode plate 121 does not have the active material, it does not react with the active material of the positive electrode plate 122, and accordingly, the central portion may form a non-reaction area inside the electrode assembly 120 after being wound. Accordingly, the central portion may be suppressed from being deformed inside the electrode assembly 120.

Also, the negative electrode tab 124 is attached to the first surface of the negative electrode plate 121. A portion of the negative electrode tab 124 may be attached to the negative electrode plate 121 through welding, and protrudes downward by a predetermined length in a longitudinal direction of the electrode assembly 120. In more detail, the active materials are not applied to a front end and a rear end of the negative electrode plate 121, respectively, so that a non-coating portion, through which the negative electrode plate 121 is exposed, may be formed, and a negative electrode tab may be coupled to the non-coating portion so as to be electrically connected to the negative electrode plate 121. The negative electrode tab 124 may be made of a copper material or a nickel material, but the present invention is not limited thereto.

The positive electrode plate 122 is constituted by a plate-shaped metal foil, which is made of aluminum (Al), and a positive electrode coating part 127, which are active materials made of a transition metal oxide, are applied on both surfaces of the negative electrode plate 122. Here, the positive electrode plate 122 may include a first positive electrode plate 122a located on the first surface, and a second positive electrode plate 122b located on the second surface with respect to the negative electrode plate 121. That is, the positive electrode plate 122 may be constituted by the first positive electrode plate 122a and the second positive electrode plate 122b, which are separated from each other, and may be wound together with the negative electrode plate 121 while the positive electrode plates 122 are located on the top and bottom surfaces with respect to the negative electrode plate 121, respectively.

The positive electrode coating part 127 may be formed on each of the first and second positive electrode plates 122a and 122b, and may include a first positive electrode coating part 127a formed on the first surface and a second positive electrode coating part 127b formed on a second surface that is opposite to the first surface.

In addition, the positive electrode tab 125 may be formed on the positive electrode plates 122a and 122b. In more detail, the positive electrode tab 125 may include a first positive electrode tab 125a coupled to the first surface of the first positive electrode plate 122a, and a second positive electrode tab 125b coupled to the first surface of the second positive electrode plate 122b. Portions of the first and second positive electrode tabs 125a and 125b may be partially welded to be attached to the positive electrode plates 122a and 122b, respectively, and protrude upward by a predetermined length in the longitudinal direction of the electrode assembly 120. The first and second positive electrode tabs 125a and 125b may be formed to be symmetrical with respect to the center of a winding central portion c in the transverse cross-section of the wounded electrode assembly 120. In more detail, the first and second positive electrode tabs 125a and 125b are linearly formed to be parallel to each other along a radius r of the transverse cross-section, which is a length between the winding central portion c and an outermost portion o in the transverse cross-section, are located in opposite directions with respect to the winding central portion c, and then, may be easily coupled to an bottom surface of the case 110.

In addition, the negative electrode tab 124 and the positive electrode tab 125 may be located on the same surface of the negative electrode plate 121 and the positive electrode plate 122, which are wound, and may be located on the second surfaces of the negative electrode plate 121 and the positive electrode plate 122. Here, the same surface may be a surface facing the outermost side o in the same manner or may be a surface facing the winding central portion (c) in the same manner, in the wound electrode assembly 120. In addition, when the positive electrode tab 125 is formed on a surface facing the outermost side o in the electrode assembly 120, it means that the opposite surface of which is wound, and vice versa. That is, the present invention is not limited to the surfaces, on which the negative electrode tab 124 and the positive electrode tab 125 are attached on the opposite surface of the positive electrode plate 122 and the negative electrode plate 121 in the form of a foil.

Furthermore, the negative electrode tab 124 and the positive electrode tab 125 may be located to be arranged on the same line in the longitudinal direction in the wound electrode assembly 120. Furthermore, the negative electrode tab 124 and the positive electrode tab 125 are located so as not to overlap each other in the longitudinal direction in the wound electrode assembly 120. That is, an upper portion of the negative electrode tab 124 and a lower portion of the positive electrode tab 125 may be located so as not to overlap each other on the same line in the longitudinal direction of the electrode assembly 120. This is for preventing a winding roundness the electrode assembly 120 from decreasing when the negative electrode tab 124 and the positive electrode tab 125, which have thicknesses thicker than those of the positive electrode plate 122 and the negative electrode plate 121, overlap each other in the longitudinal direction of the electrode assembly 120. The positive electrode tab 125 may be made of an aluminum material, but the present invention is not limited thereto.

In addition, as will be described below, the mandrel is coupled to fix the negative electrode tab 124 on the negative electrode plate 121 while the positive electrode plates 122a and 122b are located on the first and second surfaces of the negative electrode plate 121, respectively, and in this state, starts the winding while rotating in one direction (e.g., a clockwise direction). Accordingly, since the first positive electrode tab 125a and the second positive electrode tab 125b on the positive electrode plates 122a and 122b are wound from the negative electrode tabs 124 of the inside of the mandrel by the same length, the first positive electrode tab 125a and the second positive electrode tab 125b may be located to be symmetrical with respect to the winding center c. Furthermore, in the winding method, since the positive electrode tabs 125a and 125b are easily arranged, the process efficiency thereof may be improved.

In addition, a first insulation plate 128 coupled to the case 110 and having a first hole 128a formed at the center thereof and a second hole 128b formed outside the first hole 128a may be interposed between the electrode assembly 120 and the bottom part 111. The first insulation plate 128 functions to prevent the electrode assembly 120 from being electrically contacted to the bottom part 111 of the case 110. In particular, the first insulation plate 128 functions to prevent the positive electrode plate 122 of the electrode assembly 120 from being electrically contacted to the bottom part 111. Here, the first hole 128a functions to allow a gas to rapidly flow upward when a large amount of gas is generated due to an abnormality of the secondary battery, and the second hole 128b functions to allow the negative electrode tab 124 to pass through the second hole 128b and be welded to the bottom part 111. Additionally, a center pin (not shown) having a substantially cylindrical pipe shape, of which a center is hollow, is further provided so that the large amount of gas generated when the secondary battery is abnormal may be easily discharged through the inner passage of the center pin.

In addition, a second insulation plate 129 coupled to the case 110, and having a first hole 129a formed at the center thereof and a plurality of second holes 129b formed outside the first hole 129a may be interposed between the electrode assembly 120 and the cap assembly 130. The second insulation plate 129 functions to prevent the electrode assembly 120 from being electrically contacted to the cap assembly 130. In particular, the second insulation plate 129 functions to prevent the negative electrode plate 121 of the electrode assembly 120 from being electrically contacted to the cap assembly 130. Here, the first hole 129a functions to allow a gas to rapidly flow to the cap assembly 130 when a large amount of gas is generated due to an abnormality of the secondary battery, and the second hole 129b functions to allow the positive electrode tab 125 to pass through the second hole 129b and be welded to the cap assembly 130.

Furthermore, the other second hole 129b functions to allow the electrolyte to rapidly flow into the electrode assembly 120 in a process of injecting the electrolyte. The electrolyte functions as a flow medium of the lithium ions generated by an electrochemical reaction in the positive electrode plate and the negative electrode plate in the battery when the battery is charged and discharged.

The cap assembly 130 includes a cap-up 131 having a plurality of through-holes 131d, a safety plate 133 installed at a lower portion of the cap-up 131, a connection ring 135 installed at a lower portion of the safety plate 133, a cap-down 136 coupled to the connection ring 135 and having first and a second through-holes 136a and 136b, a sub-plate 137 fixed to a lower portion of the cap-down 136 so as to be electrically connected to the positive electrode tab 125, and an insulation gasket insulating the cap-up 131, the safety plate 133, the connection ring 135, and the cap-down 136 from a side part 111 of the case 110.

Here, the first positive electrode tab 125a and the second positive electrode tab 125b, which constitute the positive electrode tab 125, may be coupled to the sub-plate 137 together. Here, as described above, since the first positive electrode tab 125a and the second positive electrode tab 125b may be linearly formed to be symmetrical with respect to the center of the electrode assembly 120, the first positive electrode tab 125a and the second positive electrode tab 125b may be linearly arranged when being coupled to the sub-plate 137.

The insulation gasket 138 substantially has a shape pressed between the beading part 113 formed on the side part 111 of the case 110 and the crimping part 114. In addition, the through-hole 131d formed in the cap-up 131 and the through-hole 136d in the cap-down 136 function to discharge the inner gas to the outside when an abnormal internal pressure is caused in the case 110. Of course, first, the safety plate 133 is electrically isolated from the sub-plate 137 while being inversed to the upper side, and thereafter, the inner gas is discharged to the outside as the safety plate 133 is torn.

Hereinafter, a method for winding the electrode assembly according to an embodiment of the present invention will be explained in more detail.

Referring to FIG. 7 again, a negative electrode plate 121 is coupled to pass through a center of a mandrel before winding, and a negative electrode tab 124 may be located at the center of the mandrel. Furthermore, a first positive electrode plate 122a may be located on a first surface of the negative electrode plate 121, and a second positive electrode plate 122b may be located on a second surface of the negative electrode plate 121. The first and second surfaces of the positive electrode plates 122a and 122b may be covered by a separator 123. In this case, the separator 123 may be also provided with two sheets, and the separators may be folded to cover the first positive electrode plate 122a and second positive electrode plate 122b, respectively.

In this state, if the mandrel starts to rotate in one direction (e.g., a clockwise direction), winding is started with respect to the negative electrode tab 124, and accordingly, a first positive electrode tab 125a and a second positive electrode tab 125b may be formed to be symmetrical in opposite directions with respect to the negative electrode tab 124.

Also, in this case, since the negative electrode tab 124 is located at the center of the electrode assembly 120, and the positive electrode tabs 122a and 122b are formed at locations symmetrical to each other, respectively, that is, at even locations of the electrode assembly 120, resistance may be reduced, and as a result, the number of tabs may be reduced.

In addition, since the winding in the above-described manner allows the positive electrode tab 125a and 125b to be located to be symmetrical to each other, process efficiency is improved.

The above-described embodiment is simply one embodiment for carrying out the electrode assembly and the secondary battery including the same, and the present invention is not limited to the embodiment, and the technical spirits of the present invention include all ranges of technologies that may be variously modified by an ordinary person in the art, to which the present invention pertains, without departing from the essence of the present invention as claimed in the following claims.

The invention claimed is:

1. An electrode assembly comprising:
   a first electrode plate, to which a first electrode tab is attached;
   a plurality of second electrode plates, to which second electrode tabs are attached, respectively; and
   a separator interposed between the first electrode plate and each of the plurality of second electrode plates, wherein the first electrode plate, the separator, and the plurality of second electrode plates are wound from a location where the first electrode tab is attached to the first electrode plate while being stacked with the plurality of second electrode plates being located on opposite surfaces of the first electrode plate with the location where the first electrode tab is attached to the first electrode plate therebetween, and
   wherein the second electrode tabs are symmetrical with respect to a winding center.

2. The electrode assembly of claim 1, wherein the first electrode tab is located at the winding center.

3. The electrode assembly of claim 1, wherein the plurality of second electrode plates are wound to be located on a first surface and a second surface of the first electrode plate, respectively.

4. The electrode assembly of claim 1, wherein the separator is provided in plurality to be wound so as to cover the plurality of second electrode plates, respectively.

5. The electrode assembly of claim 4, wherein the separators are folded to cover the plurality of second electrode plates, respectively, so that the plurality of second electrode plates are separated from the first electrode plate.

6. The electrode assembly of claim 1, wherein the first electrode tab and the second electrode tabs are located in a straight line on a cross-section that is perpendicular to a winding axis of the electrode assembly.

7. The electrode assembly of claim 1, wherein the plurality of second electrode plates are wound to be symmetrical to each other with reference to the first electrode plate, respectively.

8. A secondary battery comprising the electrode assembly of claim 1.

9. A method for manufacturing an electrode assembly, the method comprising:
   coupling a mandrel to a first electrode plate, to which a first electrode tab is attached at a central portion thereof so that the first electrode tab is prepared to be located on the mandrel;
   locating a plurality of second electrode plates, to which second electrode tabs are attached, respectively, on a first surface and a second surface of the first electrode plate such that the second electrode tabs are offset from each other in an extending direction of the first electrode plate with the central portion of the first electrode plate therebetween in the extending direction; and allowing the mandrel to rotate in one direction from the central portion of the first electrode plate so as to perform winding.

10. The method of claim 9, wherein the plurality of second electrode plates are located on the first electrode plate while being covered by a plurality of separators, respectively.

* * * * *